United States Patent
Kawamura et al.

(10) Patent No.: US 9,566,851 B2
(45) Date of Patent: Feb. 14, 2017

(54) MOUNTING STRUCTURE OF HIGH VOLTAGE UNIT FOR ELECTRIC VEHICLE

(71) Applicant: NISSAN MOTOR CO., LTD., Yokohama-shi, Kanagawa (JP)

(72) Inventors: Tomoki Kawamura, Zama (JP); Hirofumi Shimizu, Atsugi (JP); Nobuaki Yokoyama, Yokohama (JP); Izuho Hirano, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/429,134

(22) PCT Filed: Sep. 17, 2013

(86) PCT No.: PCT/JP2013/074983
§ 371 (c)(1),
(2) Date: Mar. 18, 2015

(87) PCT Pub. No.: WO2014/046072
PCT Pub. Date: Mar. 27, 2014

(65) Prior Publication Data
US 2015/0273994 A1    Oct. 1, 2015

(30) Foreign Application Priority Data

Sep. 19, 2012    (JP) .................................. 2012-205889

(51) Int. Cl.
*B60K 1/00*    (2006.01)
*B60K 6/26*    (2007.10)
(Continued)

(52) U.S. Cl.
CPC . *B60K 1/00* (2013.01); *B60K 6/26* (2013.01); *B60K 6/40* (2013.01); *B60L 3/0007* (2013.01);
(Continued)

(58) Field of Classification Search
CPC .............. B60K 6/26; B60K 6/40; B60K 1/00; B60L 3/0007
(Continued)

(56) References Cited

U.S. PATENT DOCUMENTS 6,198,183 B1 * 3/2001 Baeumel ............... F04D 25/068
310/52
7,207,187 B2 * 4/2007 Funahashi ............... F01C 21/10
62/113

(Continued)

FOREIGN PATENT DOCUMENTS

CN    102255436 A    11/2011
JP    08-310252 A    11/1996
(Continued)

*Primary Examiner* — J. Allen Shriver, II
*Assistant Examiner* — Brian Cassidy
(74) *Attorney, Agent, or Firm* — Foley & Lardner LLP (57) ABSTRACT

A mounting structure of a high voltage unit for an electric vehicle includes a first high voltage unit that has vehicle body fixing parts to be fixed to a vehicle body at both ends in a width direction, and a second high voltage unit that is arranged on an upper side of the first high voltage unit in a vertical direction of the vehicle, in which, in the second high voltage unit, a high voltage heavy component included in the second high voltage unit is arranged closer to a lowermost surface in the vertical direction of the vehicle.

15 Claims, 7 Drawing Sheets

(51) Int. Cl.
  *B60K 6/40* (2007.10)
  *B60L 15/00* (2006.01)
  *B60L 3/00* (2006.01)
  *B60K 11/04* (2006.01)

(52) U.S. Cl.
  CPC .............. *B60L 15/007* (2013.01); *B60K 11/04* (2013.01); *B60K 2001/003* (2013.01); *B60Y 2306/01* (2013.01)

(58) Field of Classification Search
  USPC ........................................................ 180/68.5
  See application file for complete search history.

(56) References Cited

U.S. PATENT DOCUMENTS

| | | | | |
|---|---|---|---|---|
| 7,973,439 B2* | 7/2011 | Watanabe | ........... | F04B 27/0895 310/71 |
| 8,007,255 B2* | 8/2011 | Hattori | ................. | B60H 1/3223 310/55 |
| 8,240,163 B2* | 8/2012 | Watanabe | ........... | F04B 27/0895 62/239 |
| 8,257,060 B2* | 9/2012 | Hattori | ................. | H01L 23/492 417/321 |
| 8,272,462 B2* | 9/2012 | Yoshida | ................... | B60K 1/02 180/65.1 |
| 8,657,365 B2* | 2/2014 | Amano | .................... | B60K 1/00 296/187.11 |
| 8,670,234 B2* | 3/2014 | Nakano | .............. | H02K 11/0073 361/690 |
| 8,764,415 B2* | 7/2014 | Hattori | ............... | H05K 11/0089 417/410.1 |
| 9,179,581 B2* | 11/2015 | Suwa | ................. | H05K 7/20927 |
| 2003/0200761 A1* | 10/2003 | Funahashi | ............... | F01C 21/10 62/228.4 |
| 2005/0223727 A1* | 10/2005 | Funahashi | ............... | F01C 21/10 62/228.4 |
| 2006/0064998 A1* | 3/2006 | Funahashi | ............... | F01C 21/10 62/228.4 |
| 2009/0096301 A1 | 4/2009 | Sumi et al. | | |
| 2009/0206709 A1 | 8/2009 | Kakuda et al. | | |
| 2010/0303648 A1* | 12/2010 | Watanabe | ............. | F04B 39/121 417/411 |
| 2011/0285223 A1 | 11/2011 | Miyachi et al. | | |

FOREIGN PATENT DOCUMENTS

| | | |
|---|---|---|
| JP | 2007-099239 A | 4/2007 |
| JP | 2009-118725 A | 5/2009 |
| JP | 2009-201218 A | 9/2009 |
| JP | 2010-148264 A | 7/2010 |
| JP | 2010-158991 A | 7/2010 |
| JP | 2012-105369 A | 5/2012 |

\* cited by examiner

MOUNTING STRUCTURE OF HIGH VOLTAGE UNIT FOR ELECTRIC VEHICLE

TECHNICAL FIELD

The present invention relates to a mounting structure of a high voltage unit that is mounted on an electric vehicle.

BACKGROUND ART

An electric vehicle that uses only an electric motor as a drive source, or a hybrid vehicle that uses both of the electric motor and an internal combustion engine as the drive source is provided with the electric motor and an inverter that controls the drive of the electric motor as high voltage units. JP2009-201218A discloses such a structure that an inverter case, receiving an inverter, is arranged on the upper side of a motor case, receiving a motor, to form an electromechanical integrated unit, and this electromechanical integrated unit is fixed to a vehicle body via a vehicle body fixing part, provided on the motor case. The high voltage units that are arranged in the vertical direction of the vehicle like this cause such an advantage that a space in a motor room is easily secured, as compared with the case where the high voltage units are arranged in the longitudinal direction or in the lateral direction of the vehicle.

SUMMARY OF INVENTION

When the vehicle comes into collision, the electromechanical integrated unit makes rotational motion centered about the vehicle body fixing part, due to an inertial force. At this time, when the inverter case and the motor case are arranged in the vertical direction as described above, a distance between the vehicle body fixing part and the the barycenter of the inverter case becomes longer, as compared with the case where the inverter case and the motor case are arranged in the width direction. This increases a moment of inertia applied to the inverter case at the time of the collision of the vehicle. As the moment of inertia applied to the inverter case becomes larger, an impact load caused when the inverter case collides with another component or the like in the motor room becomes greater, and the possibility of breakage of the inverter case becomes higher.

It is an object of the present invention to mount a high voltage unit for an electric vehicle in such a manner that, when the vehicle comes into collision, an impact load to a high voltage unit can be reduced and breakage of the high voltage unit can be prevented.

According to an aspect of the present invention, a first high voltage unit that has vehicle body fixing parts to be fixed to a vehicle body at both ends in a width direction, and a second high voltage unit that is arranged on an upper side of the first high voltage unit in a vertical direction of the vehicle are provided, in which, in the second high voltage unit, a high voltage heavy component included in the second high voltage unit is arranged closer to a lowermost surface in the vertical direction of the vehicle.

DESCRIPTION OF EMBODIMENTS

Hereinafter, embodiments of the present invention will be explained with reference to the attached drawings.

First Embodiment

Figure 1A:
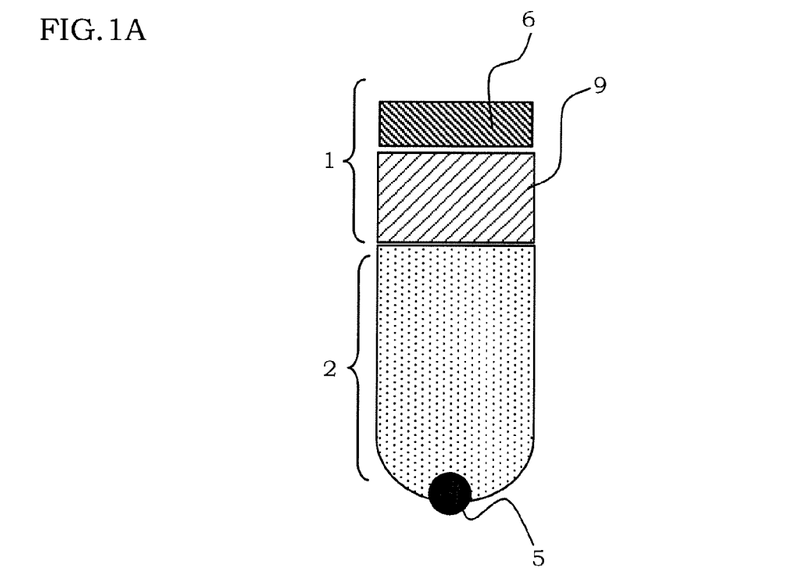
FIG. 1A is a side view of a mounting structure of a high voltage unit for an electric vehicle according to a first embodiment.
Figure 1B:
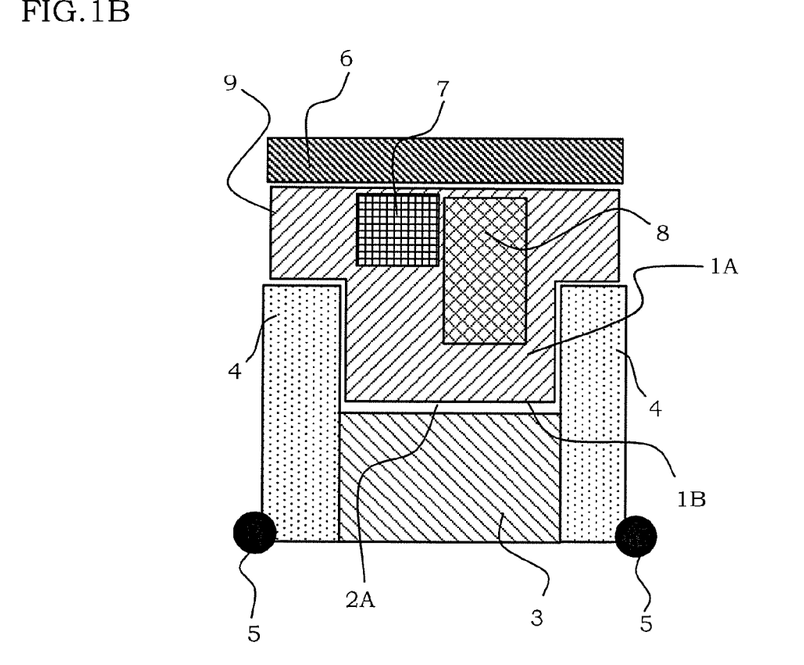
FIG. 1B is a front view of the mounting structure of the high voltage unit for the electric vehicle according to the first embodiment.

FIG. 1 are views illustrating a mounting structure of a high voltage unit for an electric vehicle according to a first embodiment of the present invention, in which FIG. 1A is a view seen from the width direction (side view), and FIG. 1B is a view seen from the vehicle front (front view). It should be noted that, in FIG. 1A, the left side in the drawing is the vehicle front.

An electric motor 2, as a first high voltage unit, is a permanent magnet synchronous motor, for example. The electric motor 2 is formed by including a housing 3 that has a cylindrical structure extending in the width direction, and inverter fixing parts 4 that are arranged at both ends in the width direction of the housing 3. The electric motor 2 is fixed to the vehicle via mounts 5 that are provided at both ends in the width direction.

An inverter 1, as a second high voltage unit, is formed by including high voltage components such as a power module 7, a smoothing capacitor 8 and the like that will be described later, an inverter case 9 that receives these, and a cooler 6 that has a flat plate structure, and outputs a three-phase current to the electric motor 2. The inverter 1 is mounted on the electric motor 2. Incidentally, the inverter 1 and the electric motor 2 are fastened by bolts. Moreover, the cooler 6 is fastened onto the inverter case 9 by bolts.

Inside the inverter case 9, the power module 7 and the smoothing capacitor 8, each being a component having a relatively large mass among the high voltage components (high voltage heavy component), are fixed by bolts in such a manner that these are housed between the left and right inverter fixing parts 4 when viewed from the front side of the vehicle, as illustrated in FIG. 1B, for example.

A part of a lower surface 1B of the inverter 1 forms a convex part 1A that projects downwardly in the vertical direction of the vehicle. This convex part 1A engages with a concave part 2A that is formed between the two inverter fixing parts 4 of the electric motor 2, as a result of which the inverter 1 and the electric motor 2 are formed integrally.

Figure 2A:
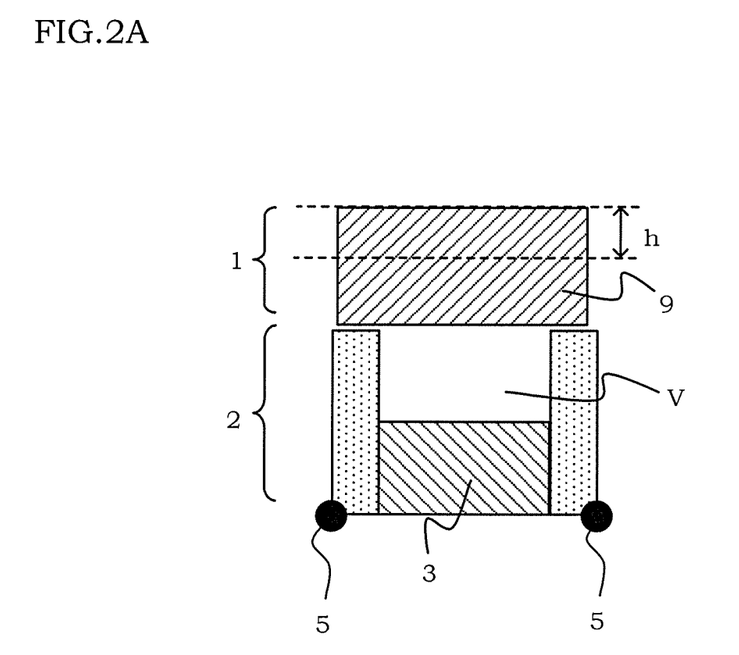
FIG. 2A is a front view of a conventional electromechanical integrated structure.
Figure 2B:
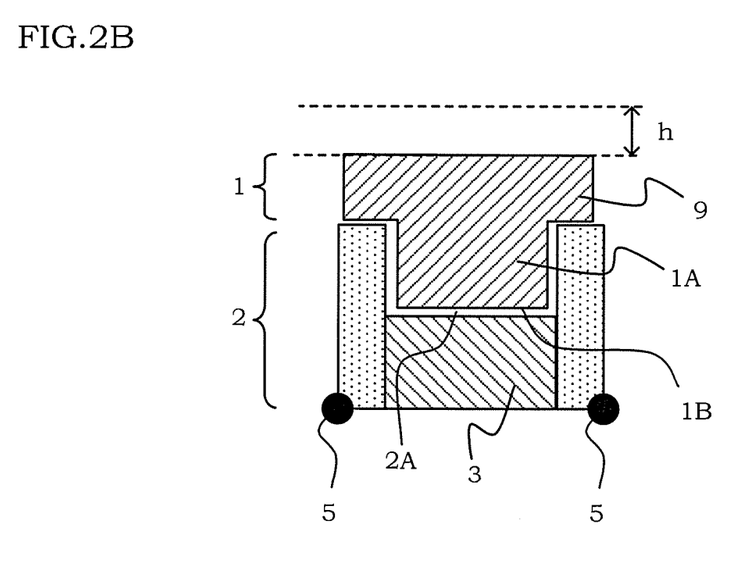
FIG. 2B is a front view of an electromechanical integrated structure according to this embodiment.

FIG. 2 are views for explaining the lowered center of gravity of the inverter 1, in which FIG. 2A illustrates a combination of the inverter 1 whose lower surface forms a flat plate and the electric motor 2, and FIG. 2B illustrates a combination of the inverter 1 according to this embodiment and the electric motor 2.

Conventionally, there has been a space (concave part 2A) in the electric motor 2 at the position between the left and right inverter fixing parts 4 and above the housing 3. When the inverter 1 is arranged on the electric motor 2 like this, the concave part 2A is left unused, as illustrated in FIG. 2A, if the bottom surface of the inverter 1 forms the flat plate.

Meanwhile, when the convex part 1A that engages with the concave part 2A is provided on the lower surface 1B of the inverter 1, it is possible to keep the volume that is similar to that of the inverter 1 in FIG. 2A, and at the same time, to reduce the height in the vertical direction of the vehicle of an electromechanical integrated structure, formed by the electric motor 2 and the inverter 1, by the height received in the concave part 2A (h in the drawings). Namely, the barycenter position of the inverter 1 can be made lower when the integrated structure is made by the electric motor 2 and the inverter 1, as compared with the case where the bottom surface of the inverter 1 forms the flat plate as illustrated in FIG. 2A.

Further, according to this embodiment, a part of the smoothing capacitor 8, having the largest mass among the high voltage components included in the inverter 1, is arranged to be housed inside the convex part 1A. This further increases the above-described effect of lowering the position of the barycenter.

Incidentally, the power module 7 and the smoothing capacitor 8 are arranged on the upper surface of the inverter 1, and the upper surface has a horizontal flat plate structure. This makes it possible to allow the height between a line connecting the two mounts 5 and the cooler 6 to be constant, when the cooler 6 having the flat plate structure is mounted on the inverter 1.

Operations and effects of the mounting structure of the inverter 1 and the electric motor 2, as described above, are explained.

Consideration is given to the case where the vehicle comes into collision. When, for example, the vehicle comes into collision at its front, the inverter 1 and the electric motor 2 rotate counterclockwise in the drawings, by an inertial force, around the line connecting the two mounts 5 as a rotation axis. Namely, the inverter 1 and the electric motor 2 tilt toward the front side of the vehicle. The tilt of the inverter 1 and the electric motor 2 may cause them to come into collision with a vehicle body structural component, such as a radiator core, that is on the front side of the vehicle from them.

An impact of the collision with the vehicle body structural component becomes greater as moments of inertia of the inverter 1 and the electric motor 2 become larger. According to this embodiment, the inverter case 9 is configured and the smoothing capacitor 8 is arranged in such a manner that a distance between the rotation axis connecting the two mounts 5 (hereinafter simply referred to as the "rotation axis") and the center of gravity barycenter of the inverter 1 becomes shorter. Thereby, the moment of inertia of the inverter 1 can be reduced, the impact can be relaxed, and breakage of the inverter 1 and the like due to an impact load at the time of the collision can be prevented.

Further, the upper surface of the inverter 1 is allowed to have the flat plate structure, onto which the cooler 6, having the flat plate shape, is fixed. This makes it possible to allow the distance between the rotation axis and the cooler 6 to be constant, and to suppress the increase in the moment of inertia caused by arranging the cooler 6.

Figure 3A:
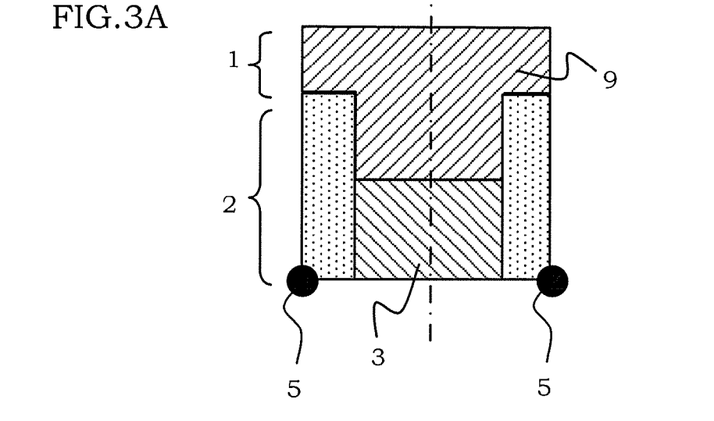
FIG. 3A is a view illustrating the electromechanical integrated structure that is similar to FIG. 1B.
Figure 3B:
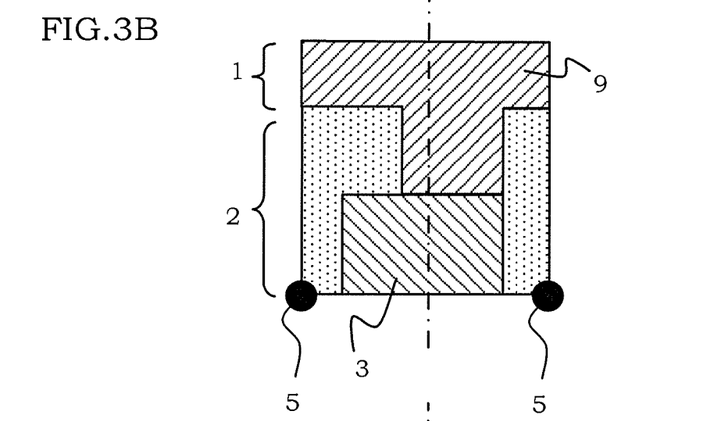
FIG. 3B is a view illustrating another example of a convex part of an inverter.
Figure 3C:
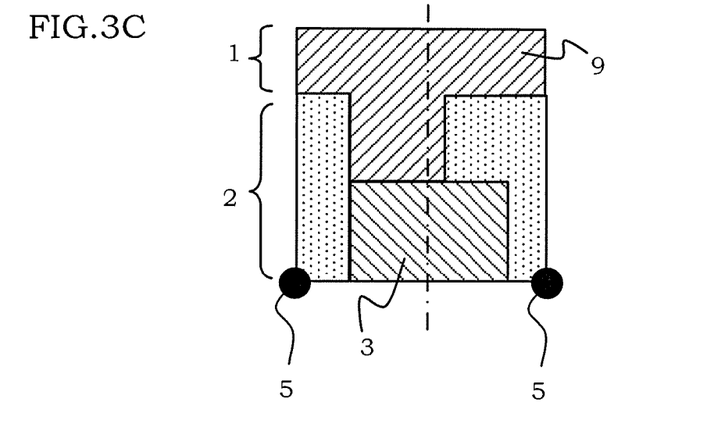
FIG. 3C is a view illustrating still another example of the convex part of the inverter.

FIG. 3A illustrates the inverter 1 and the electric motor 2 extracted from FIG. 1B or the like. Namely, the center in the width direction of the convex part 1A is provided to agree with the center in the width direction of the inverter case 9. In addition, the center in the width direction of the concave part 2A is also provided to agree with the center in the width direction of the electric motor 2, and the center in the width direction of the convex part 1A also agrees with the center in the width direction of the concave part 2A. The above-described effect obtained by providing the convex part 1A is not limited to the structure like this. When, for example, the convex part 1A is provided at the position shifted from the center in the width direction of the inverter case 9, as illustrated in FIG. 3B and FIG. 3C, it is also possible to obtain the effect of lowering the barycenter, which is obtained by providing the convex part 1A that projects downwardly in the vertical direction of the vehicle. According to the structure of FIG. 3A, however, the distance from each position along the width direction of the rotation axis to the barycenter of the inverter 1 can be shortened uniformly, and the moment of inertia at the time of the collision can be further reduced.

Second Embodiment

Figure 4:
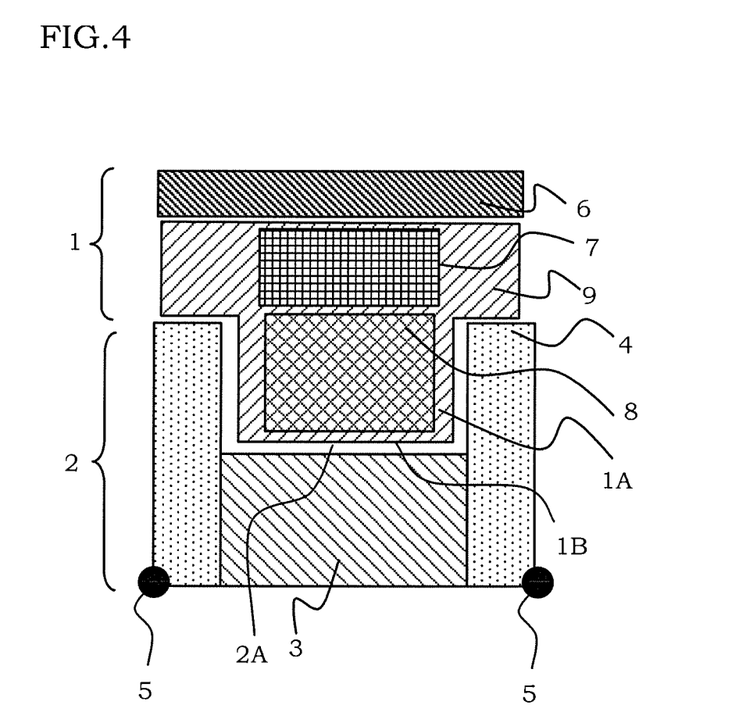
FIG. 4 is a front view of the mounting structure of the high voltage unit for the electric vehicle according to a second embodiment.

FIG. 4 is a view illustrating the mounting structure of the high voltage unit for the electric vehicle according to a second embodiment of the present invention, when viewed from the front side of the vehicle.

This embodiment is the same as the first embodiment in that the center in the width direction of the convex part 1A agrees with the center in the width direction of the inverter 1, but is different from the first embodiment in the arrangement of the power module 7 and the smoothing capacitor 8. Specifically, the smoothing capacitor 8, having the largest mass among the high voltage components included in the inverter 1, is arranged on the bottom surface of the convex part 1A, that is, on a lowermost surface 1B of the inverter 1, and the power module 7 is arranged thereon. In addition, the smoothing capacitor 8 is arranged in such a manner that its center in the width direction agrees with the center in the width direction of the convex part 1A.

In other words, the smoothing capacitor 8, having the largest mass among the high voltage components included in the inverter 1, is arranged at the position closest to the rotation axis, and the power module 7, having the second largest mass, is arranged at the position closer to the rotation axis next to the smoothing capacitor 8.

Operations and effects of the above-described structure are explained.

As the smoothing capacitor 8, having the largest mass among the high voltage components included in the inverter 1, is arranged on the lowermost surface 1B of the convex part 1A, the position of the barycenter of the inverter 1 can be made lower. As a result of this, the moment of inertia at the time of the collision is reduced, the impact is relaxed, and the breakage of the inverter 1 can be prevented.

Further, as the smoothing capacitor 8 is arranged in such a manner that its center in the width direction agrees with the center in the width direction of the convex part 1A, the distance from each position along the width direction of the rotation axis to the barycenter of the inverter 1 can be shortened uniformly. As a result of this, the moment of inertia of the inverter 1 at the time of the collision can be further reduced.

Furthermore, the smoothing capacitor 8, having the largest mass among the high voltage components included in the inverter 1, and the power module 7, having the second largest mass, are arranged closer to the rotation axis as the mass is larger. Thereby, the moment of inertia at the time of the collision can be reduced efficiently.

Figure 5A:
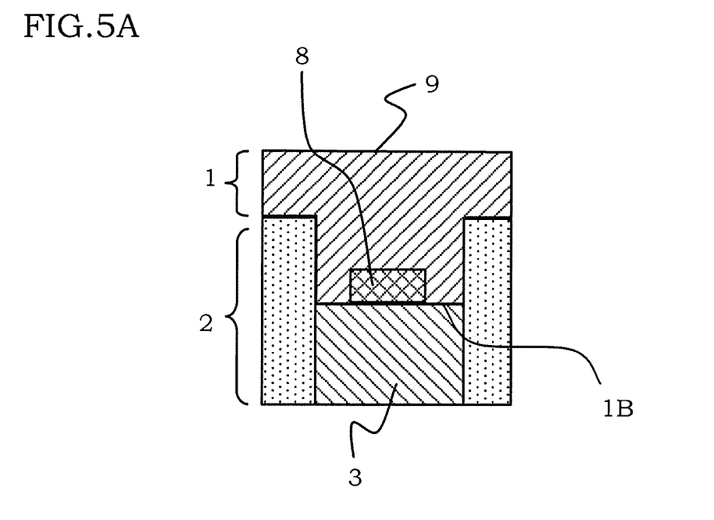
FIG. 5A is a view illustrating a lowermost surface when the inverter is provided with the convex part.
Figure 5B:
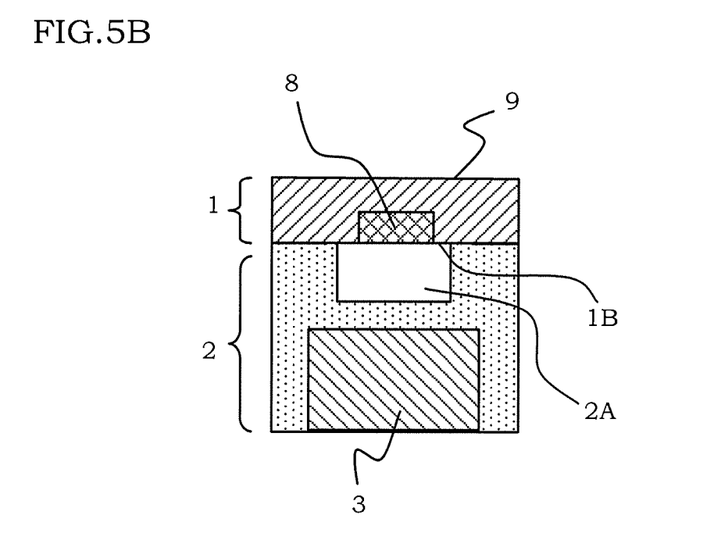
FIG. 5B is a view illustrating the lowermost surface when a lower surface of the inverter forms a flat plate.

Although the case of arranging the high voltage component, having the relatively larger mass among the high voltage components included in the inverter 1, on the lowermost surface 1B of the convex part 1A has been explained as an example, but this is not restrictive. In FIG. 5A, similarly to the above, the lowermost surface of the inverter 1 forms the lowermost surface 1B of the convex part 1A, and the smoothing capacitor 8 is arranged on the lowermost surface 1B. Meanwhile, FIG. 5B illustrates the case where the convex part 1A does not exist on the lower surface of the inverter 1. As the convex part 1A does not exist, the lowermost surface 1B of the inverter 1 comes in contact with the upper surface of the electric motor 2. Even in this case, when the smoothing capacitor 8 is arranged on the lowermost surface 1B of the inverter 1, the position of the barycenter of the inverter 1 is made lower, and the moment of inertia at the time of the collision can be reduced. It should be noted that the position where the smoothing capacitor 8 is arranged is not limited to the lowermost surface 1B of the inverter 1, and any position is possible as long as the position of the barycenter of the inverter 1 can be made lower. When, for example, the smoothing capacitor 8 is arranged at the position closer to the lowermost surface 1B, that is, the position closer to the lowermost surface 1B than to the uppermost surface, the barycenter can be made lower, although the effect is smaller as compared with the case where the smoothing capacitor 8 is arranged on the lowermost surface 1B.

Third Embodiment

Figure 6A:
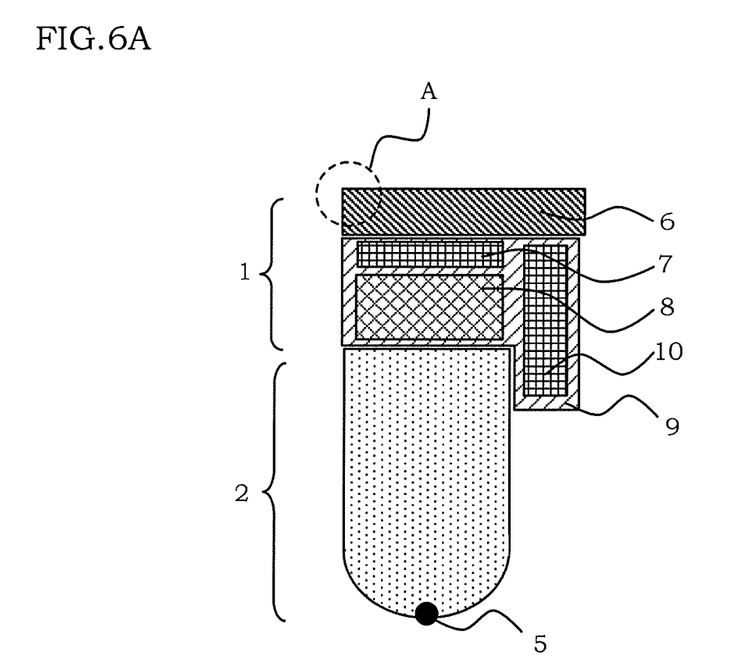
FIG. 6A a front view of the mounting structure of the high voltage unit for the electric vehicle according to a third embodiment.
Figure 6B:
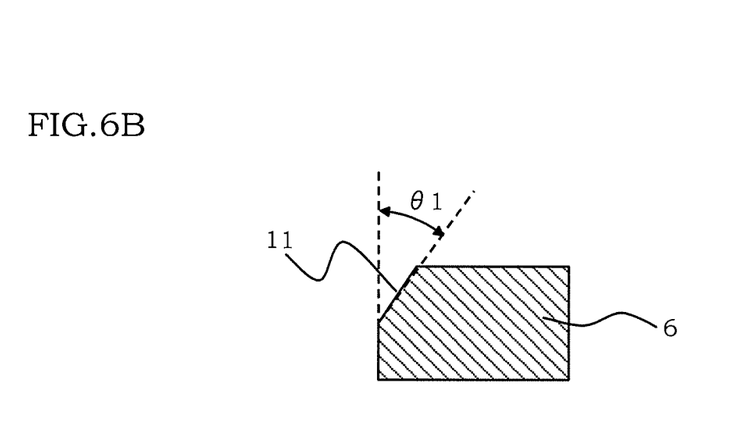
FIG. 6B is an enlarged view of a region A in FIG. 6A.

FIG. 6A is a view illustrating the mounting structure of the high voltage unit for the electric vehicle according to a third embodiment of the present invention, when viewed from the front side of the vehicle. FIG. 6B is an enlarged view of a region A that is circled by a broken line in FIG. 6A.

According to this embodiment, the smoothing capacitor 8 and the power module 7, each having the relatively large mass among the high voltage components included in the inverter 1, are arranged right above the rotation axis. Meanwhile, a substrate 10, having a smaller mass, is arranged on the rear side in the longitudinal direction of the vehicle, at a greater distance from the rotation axis as compared with the smoothing capacitor 8 and the like.

Incidentally, this embodiment is the same as the second embodiment in that the smoothing capacitor 8 is arranged on the lowermost surface 1B of the inverter 1 and that the power module 7 is arranged thereon.

Figure 7:
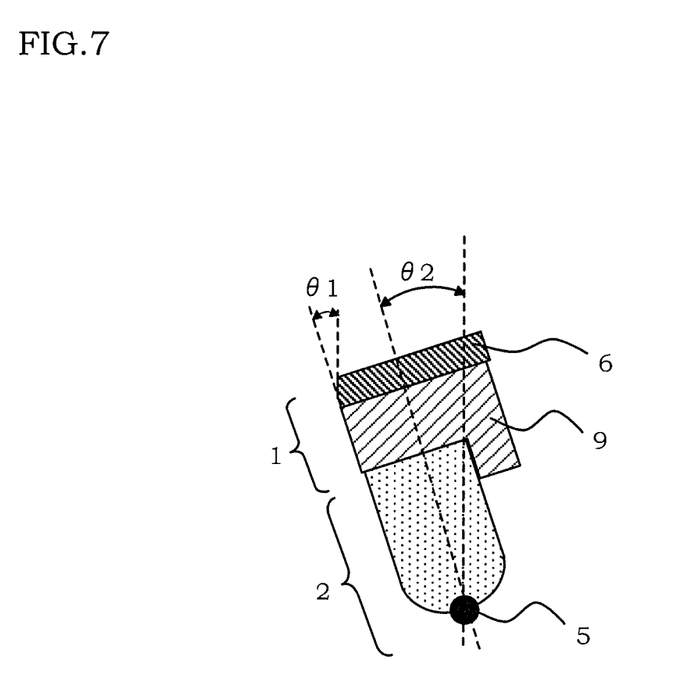
FIG. 7 is a side view illustrating the state of the electromechanical integrated structure at the time of collision.

In addition, as illustrated in FIG. 6B, the cooler 6 that is included in the inverter 1 is provided with an inclined slope 11 near the upper end of the surface on the front side in the longitudinal direction of the vehicle. As illustrated in FIG. 7, an inclination angle θ1 of the an inclined slope 11 is set to have the same angle as a rotation angle θ2 that is obtained when the inverter 1 and the electric motor 2 integrally rotate about the rotation axis, in the case where the vehicle comes into collision at its front.

Operations and effects of the above-described structure are explained.

As the smoothing capacitor 8 that is the heaviest among the high voltage components included in the inverter 1 and the power module 7 that is the next heaviest are arranged right above the rotation axis, the barycenter of the inverter 1 comes closer to the rotation axis. Namely, the barycenter of the inverter 1 and the rotation axis are brought closer to each other, so that the moment of inertia at the time of the collision can be reduced.

As described above, the inverter 1 and the electric motor 2 integrally rotate about the rotation axis at the time of the vehicle collision. The rotation angle θ2 at this time is decided by the size of the moment of inertia.

Namely, the inverter 1 and the electric motor 2, being tilted by the rotation angle θ2, come into collision with the structural component of the vehicle body, such as the radiator core, that is arranged on the front side of the vehicle. When the inclined angle θ1 is set in such a manner that the inclined slope 11 agrees with the vertical direction of the vehicle when being tilted by the rotation angle θ2, the inverter 1 collides with the structural component at the inclined slope 11. As the impact load at the time of the collision is received by the surface like this, it is possible to reduce the impact load (surface pressure) applied to the inverter 1, and to relax the impact.

The embodiments of the present invention have been explained thus far. However, the above-described embodiments are only a part of application examples of the present invention, and are not intended to limit the technical scope of the present invention to the concrete structures of the above-described embodiments.

The present application claims priority to Japanese Patent Application No. 2012-205889, filed in the Japan Patent Office on Sep. 19, 2012. The contents of this application are incorporated herein by reference in their entirety.

The invention claimed is:

1. A mounting structure of a high voltage unit for an electric vehicle, comprising:
    an electric motor having vehicle body fixing parts at each end of a bottom thereof in a width direction of the vehicle, the vehicle body fixing parts fixing the electric motor to a vehicle body; and
    an inverter arranged on an upper side of the electric motor in the vertical direction of the vehicle, wherein:
    in a cross section parallel to the vertical direction and the width direction of the vehicle, the electric motor comprises, a concave part on an upper surface thereof in the vertical direction of the vehicle and the inverter comprises a convex part on a lower surface thereof in the vertical direction of the vehicle,
    the inverter is provided with a high voltage heavy component arranged in such a manner that at least a part of the high voltage heavy component is housed inside the convex part of the inverter,
    the electric motor and the inverter are integrally formed when the convex part of the inverter is received in the concave part of the electric motor, and
    the inverter is fixed to the vehicle body in such a manner that an inertial force toward a front of the vehicle at a time of collision causes a rotational force around an axis connecting the vehicle body fixing parts, the rotational force being applied to the electric motor and the inverter which are integrally formed.

2. The mounting structure of the high voltage unit for the electric vehicle according to claim 1, wherein:

a center in the width direction of the convex part of the inverter aligns with a center in the width direction of the inverter; and the high voltage heavy component of the inverter is arranged in such a manner that its center in the width direction aligns with the center in the width direction of the convex part of the inverter.

3. The mounting structure of the high voltage unit for the electric vehicle according to claim 1, wherein:

a center in the width direction of the convex part of the inverter aligns with a center in the width direction of the inverter;

a center in the width direction of the concave part of the electric motor aligns with a center in the width direction of the electric motor; and the centers in the width direction of the concave part of the electric motor and the convex part of the inverter align with each other.

4. The mounting structure of the high voltage unit for the electric vehicle according to claim 1, wherein the high voltage heavy component of the inverter comprises a first component and a second component having a mass greater than the first component, and the second component is arranged at a position closer to an axis connecting the vehicle body fixing parts than the first component, when the electric motor and the inverter are formed integrally.

5. The mounting structure of the high voltage unit for the electric vehicle according to claim 4, wherein the high voltage heavy component of the inverter comprises a smoothing capacitor arranged at a position closest to the axis.

6. The mounting structure of the high voltage unit for the electric vehicle according to claim 1, wherein the high voltage heavy component, having a large mass among high voltage components included in the inverter, is arranged above an axis connecting the vehicle body fixing parts, when the electric motor and the inverter are formed integrally.

7. The mounting structure of the high voltage unit for the electric vehicle according to claim 1, wherein a front surface of the inverter in a longitudinal direction of the vehicle comprises an inclined slope on at least a part of its upper end side.

8. The mounting structure of the high voltage unit for the electric vehicle according to claim 7, wherein an inclination angle of the inclined slope, relative to the vertical direction of the vehicle, is the same as a rotation angle of the electric motor and the inverter due to application of the rotational force.

9. The mounting structure of the high voltage unit for the electric vehicle according to claim 1, wherein the inverter has a flat plate structure at a position where the high voltage heavy component is arranged.

10. The mounting structure of the high voltage unit for the electric vehicle according to claim 1, wherein the electric motor comprises a motor for driving the vehicle, and the inverter comprises an inverter for driving the motor.

11. The mounting structure of the high voltage unit for the electric vehicle according to claim 1, wherein the high voltage heavy component comprises a smoothing capacitor.

12. The mounting structure of the high voltage unit for the electric vehicle according to claim 1, wherein the high voltage heavy component of the inverter comprises a smoothing capacitor arranged above and aligned with the vehicle body fixing parts.

13. The mounting structure of the high voltage unit for the electric vehicle according to claim 1, wherein the concave part is a recessed part of the electric motor, and the convex part is a projecting part of the inverter.

14. The mounting structure of the high voltage unit for the electric vehicle according to claim 1, wherein the high voltage heavy component of the inverter comprises a smoothing capacitor arranged above an axis connecting the vehicle body fixing parts at ends of the electric motor.

15. The mounting structure of the high voltage unit for the electric vehicle according to claim 1, wherein the upper surface of the electric motor and the lower surface of the inverter are opposite to each other.

* * * * *